(12) United States Patent
Tabatabaei Yazdi et al.

(10) Patent No.: US 9,516,597 B2
(45) Date of Patent: Dec. 6, 2016

(54) APPARATUS AND METHODS FOR ENHANCED MOBILE POWER MANAGEMENT

(71) Applicant: QUALCOMM Incorporated, San Diego, CA (US)

(72) Inventors: Seyed Mohammadsadegh Tabatabaei Yazdi, San Diego, CA (US); Xipeng Zhu, Beijing (CN); Francesco Pica, San Diego, CA (US); Sharad Deepak Sambhwani, San Diego, CA (US); Rohit Kapoor, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/443,039

(22) PCT Filed: Sep. 10, 2013

(86) PCT No.: PCT/CN2013/083205
§ 371 (c)(1),
(2) Date: May 14, 2015

(87) PCT Pub. No.: WO2014/086178
PCT Pub. Date: Jun. 12, 2014

(65) Prior Publication Data
US 2015/0296459 A1  Oct. 15, 2015

(30) Foreign Application Priority Data
Dec. 4, 2012 (CN) ............... PCT/CN2012/085844

(51) Int. Cl.
*H04W 52/02* (2009.01)
*H04W 76/04* (2009.01)

(52) U.S. Cl.
CPC ..... *H04W 52/0235* (2013.01); *H04W 52/0222* (2013.01); *H04W 76/046* (2013.01)

(58) Field of Classification Search
CPC ........... H04W 76/046; H04W 52/0235; H04W 52/0222
See application file for complete search history.

(56) References Cited

U.S. PATENT DOCUMENTS

2005/0215274 A1* 9/2005 Matson ................ G06F 1/3203
455/522
2008/0090623 A1 4/2008 Uh et al.
(Continued)

FOREIGN PATENT DOCUMENTS

| CN | 102783221 A | 11/2012 |
| CN | 102783242 A | 11/2012 |
| EP | 2384081 A2 | 11/2011 |

OTHER PUBLICATIONS

International Search Report and Written Opinion—PCT/CN2012/085844—ISA/EPO—Sep. 12, 2013.
(Continued)

*Primary Examiner* — Brian D Nguyen
(74) *Attorney, Agent, or Firm* — Arent Fox LLP

(57) ABSTRACT

Methods and apparatus for power management comprise detecting, at a user equipment (UE), a state transition trigger, wherein the state transition trigger indicates a current data transmission termination or an anticipated data transmission termination. Further, the methods and apparatus comprise sending a state transition indication to the network entity in response to detecting the state transition trigger. Moreover, the methods and apparatus comprise adjusting a state of the UE based at least in part on sending the state transition indication to the network entity.

20 Claims, 9 Drawing Sheets

(56) References Cited

U.S. PATENT DOCUMENTS

| | | | | |
|---|---|---|---|---|
| 2009/0172432 A1* | 7/2009 | Morgan | ................ | G06F 1/3203 |
| | | | | 713/320 |
| 2011/0207465 A1* | 8/2011 | Dwyer | ................ | H04W 76/046 |
| | | | | 455/450 |
| 2012/0166819 A1* | 6/2012 | Skubic | ................. | G06F 1/3278 |
| | | | | 713/300 |
| 2012/0167118 A1* | 6/2012 | Pingili | ................. | G06F 1/3206 |
| | | | | 719/318 |

OTHER PUBLICATIONS

International Search Report and Written Opinion—PCT/CN2013/083205—ISA/EPO—Dec. 12, 2013.

* cited by examiner

APPARATUS AND METHODS FOR ENHANCED MOBILE POWER MANAGEMENT

CROSS-REFERENCE TO RELATED APPLICATION(S)

This application is a 35 U.S.C. 371 National Phase of PCT Application Ser. No. PCT/CN2013/083205, entitled "Apparatus and Methods for Enhanced Mobile Power Management," filed Sep. 10, 2013, which claims priority to International Application Serial No. PCT/CN2012/085844, entitled "Apparatus and Methods for Enhanced Mobile Power Management," filed Dec. 4, 2012, and assigned to the assignee hereof and hereby expressly incorporated by reference herein.

BACKGROUND

Field

Aspects of the present disclosure relate generally to wireless communication systems, and more particularly, to enhanced mobile power management.

Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

It is noted that one problem with current implementations relates to the power drainage in mobile devices caused by a delay in entering a low power consumption state following a completion in data transmission to a network.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, a method for power management comprises detecting, at a user equipment (UE), a state transition trigger, wherein the state transition trigger indicates a current data transmission termination or an anticipated data transmission termination. Further, the method comprises sending a state transition indication to the network entity in response to detecting the state transition trigger. Moreover, the method comprises adjusting a state of the UE based at least in part on sending the state transition indication to the network entity.

In an additional aspect, a computer program product comprising a computer-readable medium includes at least one instruction executable to cause the computer to detect, at a user equipment (UE), a state transition trigger, wherein the state transition trigger indicates a current data transmission termination or an anticipated data transmission termination. Further, the computer program product includes at least one instruction executable to cause the computer to send a state transition indication to the network entity in response to detecting the state transition trigger. Moreover, the computer program product includes at least one instruction executable to cause the computer to adjust a state of the UE based at least in part on sending the state transition indication to the network entity.

Further aspects provide an apparatus comprising means for detecting, at a user equipment (UE), a state transition trigger, wherein the state transition trigger indicates a current data transmission termination or an anticipated data transmission termination. Further, the apparatus comprises means for sending a state transition indication to the network entity in response to detecting the state transition trigger. Moreover, the apparatus comprises means for adjusting a state of the UE based at least in part on sending the state transition indication to the network entity.

In another aspect, a user equipment apparatus for power management comprising a memory storing executable instructions and a processor in communication with the memory, wherein the processor is configured to execute the instructions to detect, at a user equipment (UE), a state transition trigger, wherein the state transition trigger indicates a current data transmission termination or an anticipated data transmission termination. Further, the processor is configured to execute the instructions to send a state transition indication to the network entity in response to detecting the state transition trigger. Moreover, the processor is configured to execute the instructions to adjust a state of the UE based at least in part on sending the state transition indication to the network entity.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present aspects generally relate to enhancing power management in a user equipment (UE) to expedite the transition of the UE from a high power state to a low power state following completion of data transmission to a network. For example, various aspects of the disclosure address an issue in Rel8 Fast Dormancy, where the UE is delayed from entering into the low power state following a completion of data transmission to the network. The delay is due to a required wait for a response from the network in the form of an acknowledgement message (ACK) that initiates a state change in the UE. During the delay period, the UE maintains the high power state, which consumes increased levels of power relative to the low power state. The delay period causes the overutilization of valuable UE resources, such as communication resources, processing resources, and power. As such, some UEs may desire increased efficient allocation of resources based on their respective operational parameters. That is, a UE identified as stationary for a long duration, or a UE desiring longer operation time, may desire adjustment of conventional communication operation parameters. As such, in some aspects, the present apparatus and methods may provide an efficient solution, as compared to current solutions, to adjust the state of the UE to a relatively low power state at an earlier time relative to current solutions.

Figure 1:
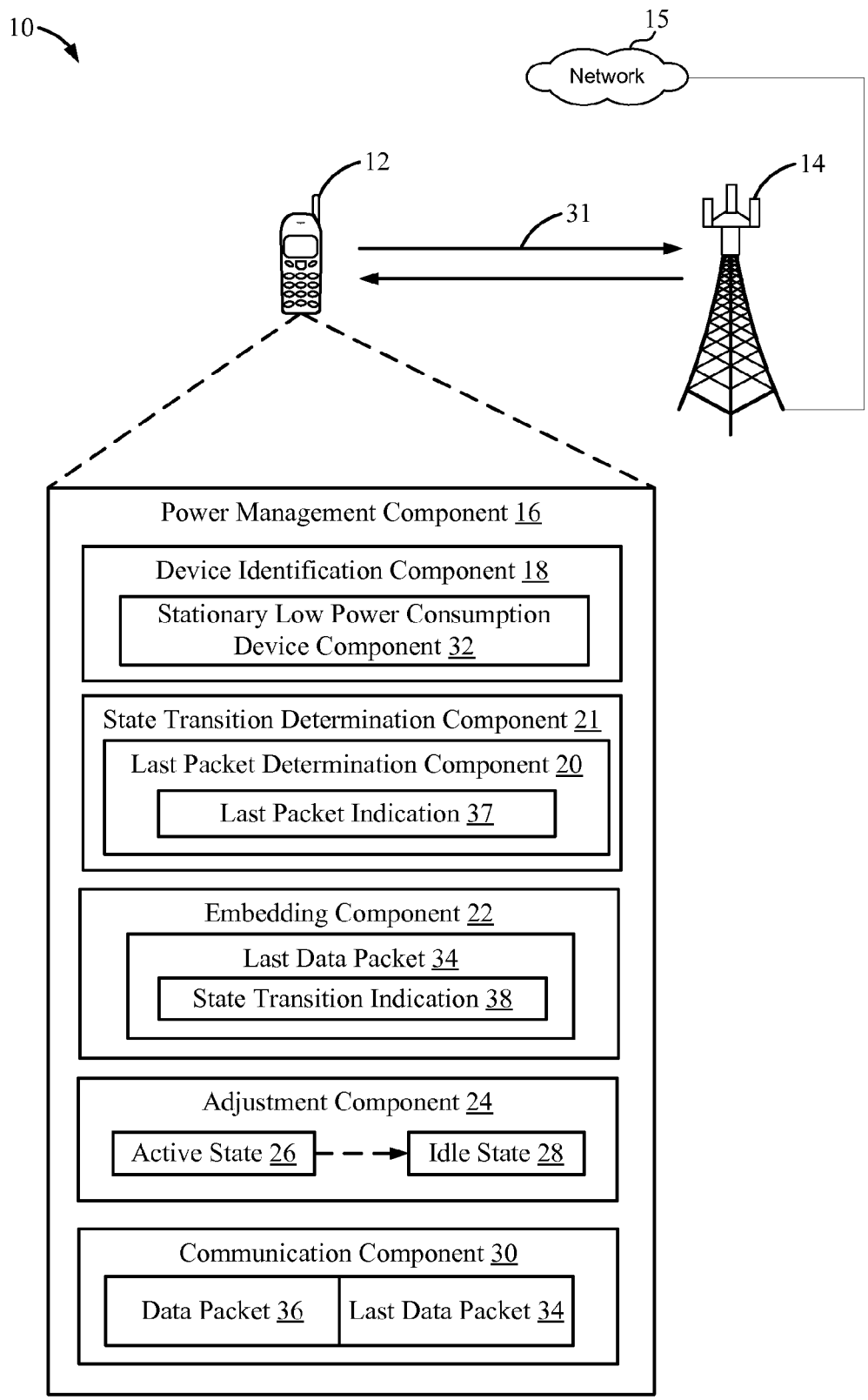
FIG. 1 is a schematic diagram of a user equipment performing a power management procedure in a network.

Referring to FIG. 1, in an aspect, a wireless communication system 10 includes UE 12 in communication coverage of at least one network entity 14. In some examples, wireless communication between UE 12 and network entity 14 may occur on one or more wireless communication channels 31. Further, UE 12 may communicate with network 15 by way of at least one network entity, for example, network entity 14.

In some aspects, UE 12 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. Additionally, network entity 14 may be a macrocell, picocell, femtocell, relay, Node B, mobile Node B, UE (e.g., communicating in peer-to-peer or ad-hoc mode with UE 12), or substantially any type of component that can communicate with UE 12 to provide wireless network access at the UE 12.

In one aspect, UE 12 may include power management component 16 configured to provide efficient power management of UE 12. For example, power management component 16 may be configured to adjust an operational state of the UE 12 from a high power state (e.g., active state 26) to a low power state (e.g., idle state 28) when UE 12 is identified as a stationary low power consumption device. In adjusting the operational state, UE 12 may terminate one or more onboard communication and/or processing resources used for maintaining an active communication session with network entity 14 immediately after completion of data transmission. Accordingly, by implementing such fast or early termination of an active state, UE 12 may conserve at least valuable power resources.

In an aspect, power management component 16 may include device identification component 18, which may be configured to identify UE 12 as stationary low power consumption device 32. The stationary low power consumption device 32 may be identified, for example but not limited hereto, based on device characteristics and/or thresholds. For example, UE 12 may be identified as a stationary low power consumption device 32 based on a particular type or class associated with UE 12. For instance, a machine type communication (MTC) device may be identified as a stationary low power consumption device 32. As a further example, UE 12 may be identified as a stationary low power consumption device 32 if a power supply level/value of UE 12 falls below a power supply threshold value.

Further, for example, UEs desiring long battery operation time may be configured to include the power management component 16. Moreover, for instance, UEs desiring fast data transmissions characterized by short delays may further be configured to include power management component 16. Further, in some aspects, a network operator, a network device, a UE manufacturer, or some other entity may pre-program (e.g., prior to UE operation) or program (e.g., based on UE operation) UE 12 as a stationary low power consumption device 32. Also, in some aspects, UE 12 may configure itself as a stationary low power consumption device.

Moreover, power management component 16 may include state transition determination component 21, which may be configured to detect and determine and subsequently trigger a state transition of UE 12. For example, state transition determination component 21 may be configured to detect a state transition trigger. In some aspects, the state transition trigger indicates a current data transmission termination or an anticipated data transmission termination. As an example, the current data termination comprises at least one of an expiration of an inactivity timer and a determination of a last packet transmitted to the network entity. In other aspects, the anticipated data termination may include at least one of an expiration of an inactivity timer and a determination of a last packet of data to be transmitted to the network entity 14. In such aspects, the determination of a last packet of data may be made by last packet determination component 20.

Additionally, state transition determination component 21 may include last packet determination component 20, which may be configured to determine a last packet 34 of a sequence of data packets 36 transmitted to the base station 14. For example, the last packet 34 may be determined based on a last packet indication 37 that identifies the last packet 34, where the last packet indication 37 may be generated directly from a protocol layer entity, such as an application layer. In some cases, for example, the last packet indication 37 may be associated with a short inactivity timer, e.g. related to a modem device within communication component 30, where the last packet indication 37 starts the inactivity timer, the expiration of which triggers generation of a request to have adjustment component 24 move the UE 12 to a power-saving state, e.g. idle state 28. As a further example, last packet determination component 20 may anticipate or otherwise expect the last packet 34 based on an expected or anticipated data communication sequence value (e.g., indicative of an anticipated length of data communication). Accordingly, the last packet indication 37 may indicate a final data communication sequence number indicating the last packet in a sequence of packets to be transmitted to network entity 14.

In further aspects, power management component 16 may include embedding component 22, which may be configured to embed a state transition indication 38 in the last packet 34. For example, following determination of a last packet 34 by last packet determination component 20, embedding component 22 may embed the state transition indication 38 in the last packet 34. In an aspect, embedding component 22 may embed last packet 34 with the state transition indication 38 in at least one of a physical layer 406, a data link layer 408 and a network layer 410 (See FIG. 8). Further, the embedding may occur in a media access control (MAC), a radio link control (RLC), radio resource control (RRC), a packet data protocol (PDP), a radio resource control (RRC), or an application layer. Thus, for example, following identification of UE 12 as a stationary low power consumption device, UE 12 may include a state transition indication 38 in a last packet 34 transmitted to network entity 14.

Further, in some aspects, state transition indication 38 may be included in an RRC message (e.g., on the control plane), and may include a signal connection release indication (SCRI). In an aspect, a unique bit in the SCRI is set by UE 12 as part of the state transition indication 38. Further, the unique bit indicates a high duration power supply requirement. In another example, the unique bit indicates to a radio network controller (RNC), via network entity 14 that UE 12 is or will be transitioning to a low power state autonomously without network control. In some aspects, the unique bit may be an additional bit configured to indicate UE autonomous state transition. As such, the unique bit in the SCRI may be set or contained in a control message header (e.g., L3/RRC). Additionally, the unique bit may be known by both UE 12 and RNC or radio access network (RAN) and indicates a state transition (e.g., single RRC target state). In other aspects, the unique or additional bit may be set or contained in a MAC or RLC message.

In other aspects, state transition indication 38 may be included in a MAC and/or RLC message (e.g., on the user plane), and may include an SCRI (e.g., unique/single bit) and a target state indication comprising at least two bits specifying the precise operating state (e.g., RRC state) UE 12 will or is currently transitioning into. For example, but not limited hereto, the at least two bits of the target state indication may indicate at least one of an Idle, a Forward Access Channel (CELL_FACH), Cell Paging Channel (CELL_PCH) and a UTRAN Registration Area (CELL_URA). In such an example, the state transition indication 38 (e.g., embedded in the last packet 34) indicates to network entity 14 that UE 12 is transitioning to an RRC state specified by the target state indication. As such, the unique bit in the SCRI and the target state indication (e.g., two bits) may be set or contained in a user plane message (e.g., L2/MAC). In some aspects, the at least two bits specifying the precise operating state (e.g., RRC state) may be set or contained in a control message header (e.g., L3/RRC).

Moreover, in an aspect, power management component 16 may include an adjustment component 24, which may be configured to adjust an operating state of UE 12 between an active state 26 and an idle or low power state 28. For example, in response to UE 12 sending the state transition indication 38 embedded in the last packet 34 to network entity 14, adjustment component 24 may change UE 12 operating state from the active state 26 to idle or low power state 28. As such, in some non-limiting cases, UE 12 does not wait for authorization or acknowledgment from network entity 14 to enter idle state 28 upon transmission of the state transition indication 38 embedded in the last packet 34. That is, in such aspects, adjustment component 24 may immediately transition UE 12 to idle state 28 upon transmission of the state transition indication 38 embedded in the last packet 34.

It should be understood that UE 12 operating in active state 26 can take various forms. However, generally, UE 12 maintains an active connection with network 15 and/or network entity 14 in active state 26. That is, UE 12 is fully operational and able to exchange communications with network entity 14. UE 12 operating in active state 26 may further include various modes in radio resource control (RRC), such as, but not limited to, a Dedicated Channel (CELL_DCH). For example, while in Cell_DCH state, a dedicated channel with an individual code is assigned to UE 12.

Additionally, for example, the idle or low power state 28 generally consumes less power than active state 26. For example, UE 12 operating in the idle or low power state 28 may not maintain any active connections with an external device, such as network entity 14. As a further example, the idle or low power state 28 may be a hibernation state, in which UE 12 may shut down communication-related resources and only turn or keep on such resources during brief wake up periods. Moreover, the idle or low power state 28 may be implemented as various states in RRC, such as, but not limited to, Idle, Forward Access Channel (CELL_FACH), Cell Paging Channel (CELL_PCH) and a UTRAN Registration Area (CELL_URA). The foregoing RRC states operate at a lower power relative to CELL_DCH.

Aspects of adjustment component 24 may be configured to cause UE 12 to enter the idle or low power state 28 before or after receiving a data reception acknowledgement message (ACK) from network entity 14 in response to network entity 14 receiving last packet 34. For example, adjustment component 24 may configure UE 12 to enter the idle or low power state 28 without receiving a network originated low power initiation message. Further, adjustment component 24 may release a network connection after sending the state transition indication to network entity 14.

Further, it should be understood that the term "state," with respect to the various operational states of UE 12 mentioned in the foregoing aspects, can be used interchangeably with mode and/or configuration.

In an additional aspect, power management component 16 may include a communication component 30, which may be configured to transmit and receive signals with network entity 14. For example, in an aspect, communication component 30 may send the state transition indication 38 embedded in the last packet 34 to network entity 14. Further, in some aspects, communication component 30 may send the state transition indication 38 in a user plane.

Thus, when UE 12 is identified as a stationary low power consumption device, UE 12 may execute power management component 16 to enhance the power consumption and/or power supply duration by adjusting an operating state of UE 12 from an active state 26 to an idle or low power state 28, thereby reducing power consumption, such as by releasing communication connection-related resources with network entity 14.

Figure 2:
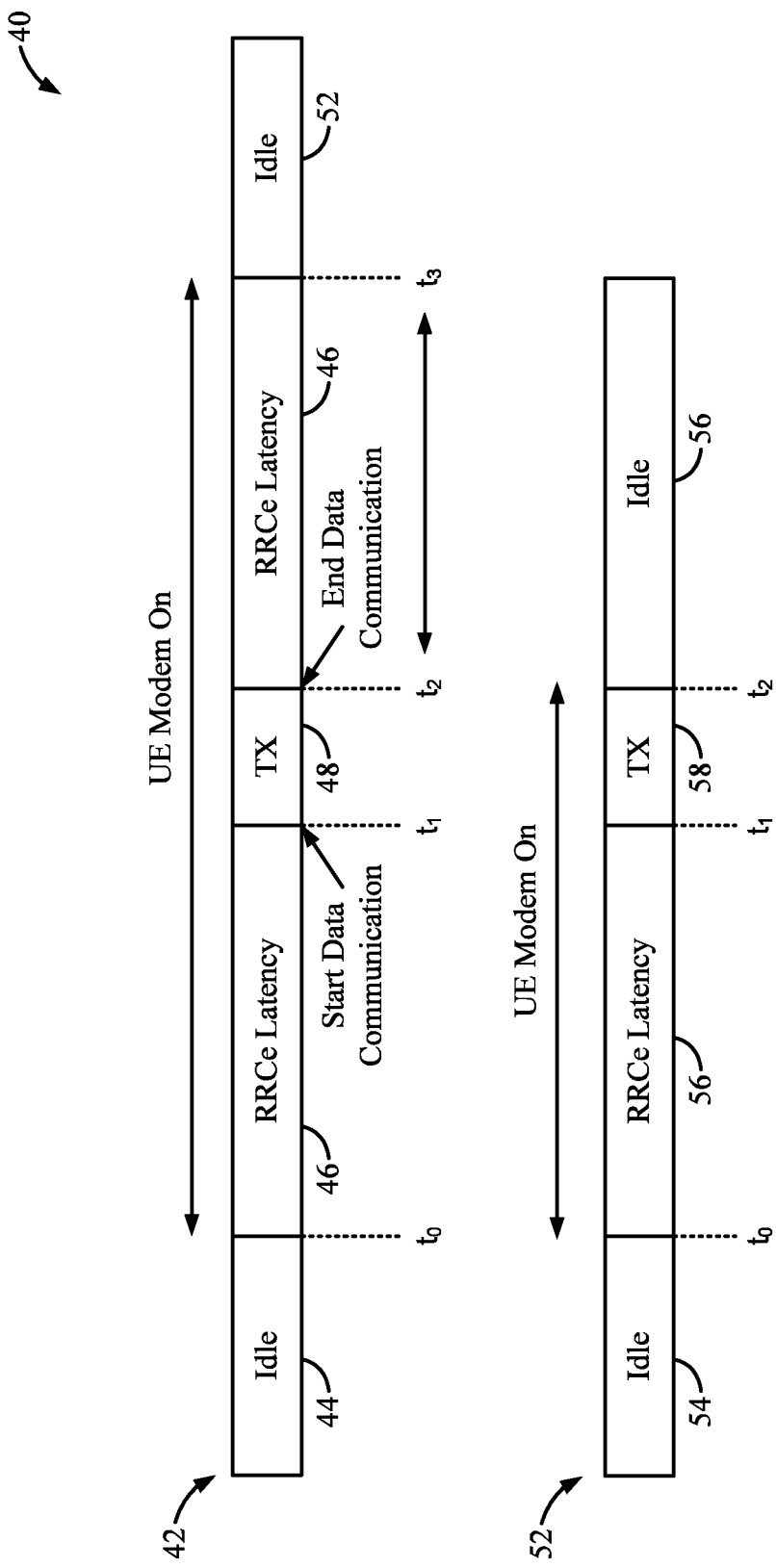
FIG. 2 is a schematic diagram comparing user equipment operation states, e.g., according to FIG. 1.

Referring to FIG. 2, in an aspect, schematic diagram 40 compares UE 12 operating states. In one aspect, a first operation state diagram 42 includes conventional UE operation, while second operation state diagram 62 includes operation of UE 12 employing the power management component 16.

For example, referring to first operation state diagram 42, initially UE 12 is in an idle (low power) state 44, operating at a lower power relative to an active state. Further, UE 12 enters an active state 46 at time $t_0$ in which RRC signaling and configuration occur, thereby causing latency prior to actual data transmission. Subsequently, during the active state 46, UE 12 may communicate with network entity 14, and transmit data at time $t_1$ (as shown in block 48) to network entity 14. At time $t_2$ UE 12 completes data transmission and waits for a network originated low power initiation message from network entity 14 while remaining in the active state 46. At time $t_3$ UE 12 enters the idle (low power) state 44. During time $t_0$ to $t_3$, UE 12 modem may be turned ON and other communication-related resources may be utilized by UE 12.

In contrast, referring to second operation state diagram 62 for example, initially UE 12 is in an idle (low power) state 54, operating at a lower power state relative to an active state. Further, UE 12 enters an active state 56 at time $t_0$ in which RRC signaling and configuration occur, thereby leading to latency before actual data transmission. During the active state 56, UE 12 may communicate with network entity 14, and transmit data at time $t_1$ as shown in block 58 to network entity 14. As part of the last packet 34 transmitted to network entity 14, power management component 16 of UE 12 may include a state transition indication 38. Thus, in response to the transmission of the last packet 34 including the state transition indication 38, UE 12, immediately, or substantially instantaneously enters or re-enters the idle (low power) state 54. During time $t_0$ to $t_2$, UE 12 modem may be turned ON and other communication-related resources may be utilized by UE 12.

In an aspect, a UE does not have to wait for a network originated low power initiation message from a network entity in response to a state transition indication including, in some aspects, an SCRI indicator. Since the state transition indication, or in some aspects, the SCRI bit is embedded in the last user plane packet, the UE may use a network acknowledgment of receipt of the last packet sent on the user plane as a trigger to release the connection with the network entity. Further, in other aspects, the UE does not send a separate SCRI L2 message on the control plane and waits for a network originated low power initiation message in response to the message.

Figure 3:
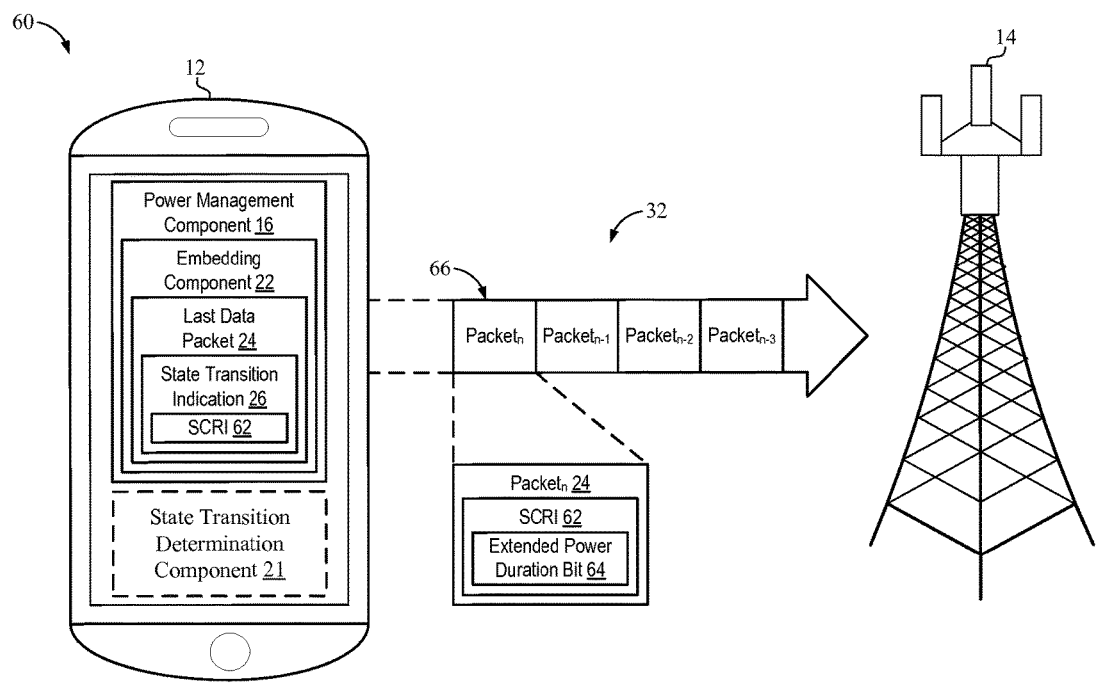
FIG. 3 is a conceptual diagram illustrating an example communication scheme by a user equipment including a power management component, e.g., according to FIG. 1.

Referring to FIG. 3, in an aspect, conceptual diagram 60 illustrates an example communication scheme according to the aspects described herein. Specifically, UE 12 may communicate one or more packets by way of one or more wireless communication channels 31. In the illustrated aspect, UE 12 may include power management component 16, which may be configured to detect or otherwise determine, via the optional last packet determination component 20, a last data packet 34 (e.g., Packet$_n$ 66) for transmission. In other aspects, power management component 16 may detect a state transition trigger (e.g., current data transmission termination or anticipated data transmission termination).

Upon detection of the state transition trigger, which may include detecting Packet$_n$ 66 as the last data packet 34, power management component 16 may execute embedding component 22 to embed Packet$_n$ 66 with state transition indication 38 to indicate to the network 15 an impending or actual transition of UE 12 from an active state to an idle state. In some aspects, state transition indication 26 may be included in at least one of a MAC message and radio link control RLC message, including the SCRI 62 and a target state indication embedded in a last packet on a user plane in response to the state transition trigger indicating the anticipated data transmission termination. In other aspects, state transition indication 26 may be included in at least one of a MAC message and RLC message, including the SCRI 62 and a target state indication embedded in a last packet on a user plane in response to the state transition trigger indicating the anticipated data transmission termination.

In some aspects, state transition indication 26 may be an additional bit in the form of an extended power duration bit 64 in SCRI 62. The extended power duration bit 64 may, in such aspects, indicate or signify the desire by UE 12 to extend the finite power supply duration (e.g., "extending battery life" or "long battery savings desired"). Additionally, in other aspects, the extended power duration bit 64 may indicate or signify UE 12 as a stationary lower power consumption device, as determined by device identification component 18 (FIG. 1). As such, the extended power duration bit 64 in SCRI 62 may effectively indicate to network entity 14 and/or network 15 the operating state (e.g., idle state), and the underlying purpose of the transition to idle state. In other aspects, the state transition indication 26 may include two bits to indicate a desired UE RRC state.

Further, upon transmission of Packet$_n$ 66 including the embedded extended power duration bit 64 in SCRI 62, UE 12 may substantially immediately transition from an active state to idle state. For example, UE 12, via power management component 16, or any of components and/or subcomponents thereof, may locally release the packet switched signaling connection. Further, in some aspects, UE 12 may transmit the embedded extended power duration bit 64 in SCRI 62 using RLC UM.

Figure 4:
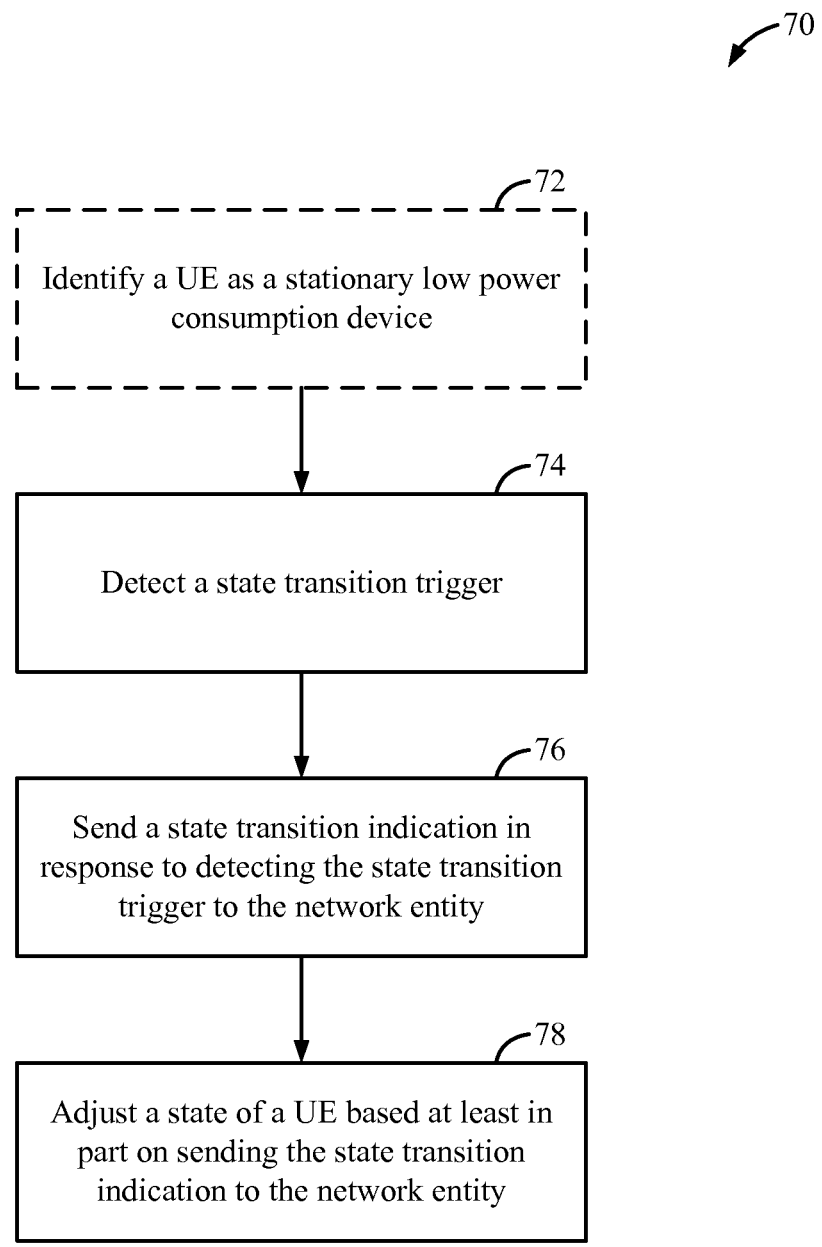
FIG. 4 is a flow chart of an aspect of a method of power management, e.g., according to FIG. 1.

Referring to FIG. 4, an example methodology 70 for enhanced mobile power management is disclosed. In an aspect, methodology 70 may be performed by components associated with a UE (e.g. UE 12). Additionally, while the methodology shown and described as a series of acts, it is to be understood and appreciated that the methodologies are not limited by the order of acts, as some acts may, in accordance with one or more aspects, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more aspects.

In an aspect, at block 72, method 70 may optionally include identifying a UE as a stationary low power consumption device. For example, as described herein, power management component 16 (FIG. 1) may execute device identification component 18 to identify UE 12 as a stationary low power consumption device 32, for example, by checking a value of a UE classification.

In other aspects, UE 12 may receive the identification in a message from network entity 14. Also, in some aspects, device identification component 18 may identify UE 12 as a stationary low power consumption device 32 based on characteristics and/or thresholds. For example, UE 12 may be identified if a power supply level/value falls below a power supply threshold value. As a further example, UE 12 may be identified based on a particular type or class identification associated with UE 12. For example, UEs desiring long battery operation time and/or fast data transmissions characterized by short delays may be configured to include the power management component 16.

At block 74, method 70 includes detecting a state transition trigger. For example, as described herein, power management component 16 (FIG. 1) may execute state transition determination component 21 to detect a state transition trigger. For example, the state transition indication trigger indicates a current data transmission termination or an anticipated data transmission termination. In some aspects, the current data termination comprises at least one of an expiration of an inactivity timer and a determination of a last packet transmitted to the network entity. Further, in other aspects, the anticipated data termination comprises at least one of an expiration of an inactivity timer and a determination of a last packet of data (e.g., last data packet 34) to be transmitted to network entity 14.

At block 76, method 70 includes sending a state transition indication to the network entity in response to detecting the state transition trigger. For example, as described herein, power management component 16 (FIG. 1) may execute communication component 30 to send a state transition indication 38 to the network entity 14 in response to detecting the state transition trigger. Further, in some aspects, state transition indication 26 may include at least one of an additional bit to indicate UE autonomous state transition and two bits to indicate a desired UE radio resource control (RRC) state. Additionally, state transition indication 26 may be included in an RRC message, including an SCRI, on the control plane in response to the state transition trigger indicating the current data transmission termination. In other aspects, state transition indication 26 is included in at least one of a MAC message and RLC message, including an SCRI and a target state indication embedded in a last packet on a user plane in response to the state transition trigger indicating the anticipated data transmission termination.

Finally, at block 78, method 70 includes adjusting a state of a UE in response to sending the state transition indication to the network entity. For example, as described herein, power management component 16 (FIG. 1) may execute the adjustment component 24, which may be configured to adjust an operating state of UE 12 from an active state 26 to the idle or low power state 28 in response to sending the state transition indication 38 to network entity 14.

Figure 5:
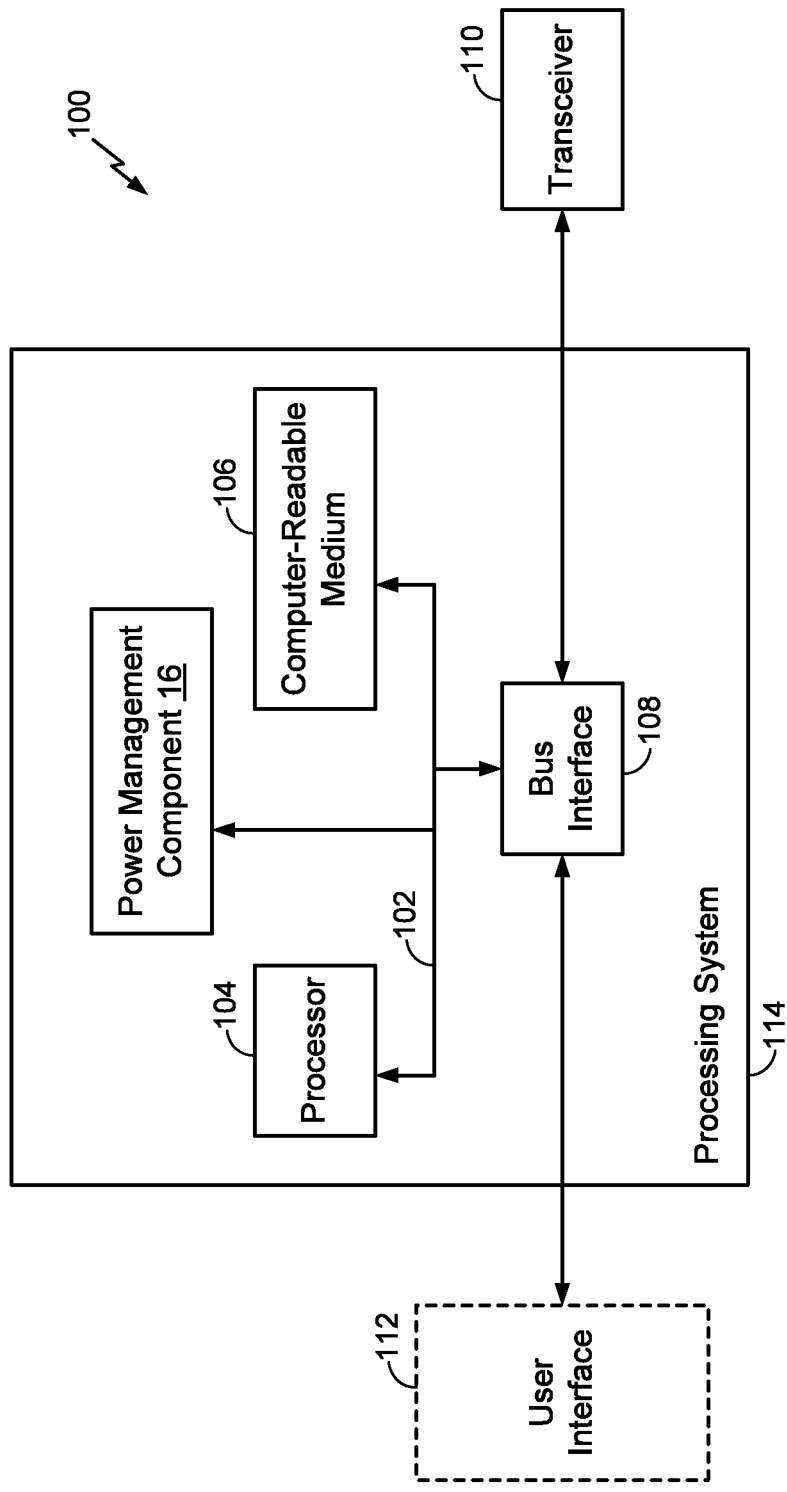
FIG. 5 is a block diagram illustrating an example of a hardware implementation for an apparatus employing a processing system, e.g., according to FIG. 1.

FIG. 5 is a block diagram illustrating an example of a hardware implementation for an apparatus 100 employing a processing system 114, wherein the system may be the same as or similar to UE 12 executing at least power management component 16 (FIG. 1). In an aspect, any of UE 12, or the one or more network entities, such as base station 14, may be represented by a specially programmed or configured computer device 100. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106.

The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

In an aspect, power management component 16 (FIG. 1) may be implemented by any one or any combination of processor 104 and computer-readable medium 106. For example, the processor 104 and/or computer readable medium 106 may be configured to, via the power management component 16, to adjust a UE 12 state following embedding in a last data packet 34 a state transition indication 38 in an identified stationary low power consumption device 32 for subsequent communication 30 (FIG. 1).

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

The various concepts presented throughout this disclosure may be implemented across a broad variety of telecommunication systems, network architectures, and communication standards.

Figure 6:
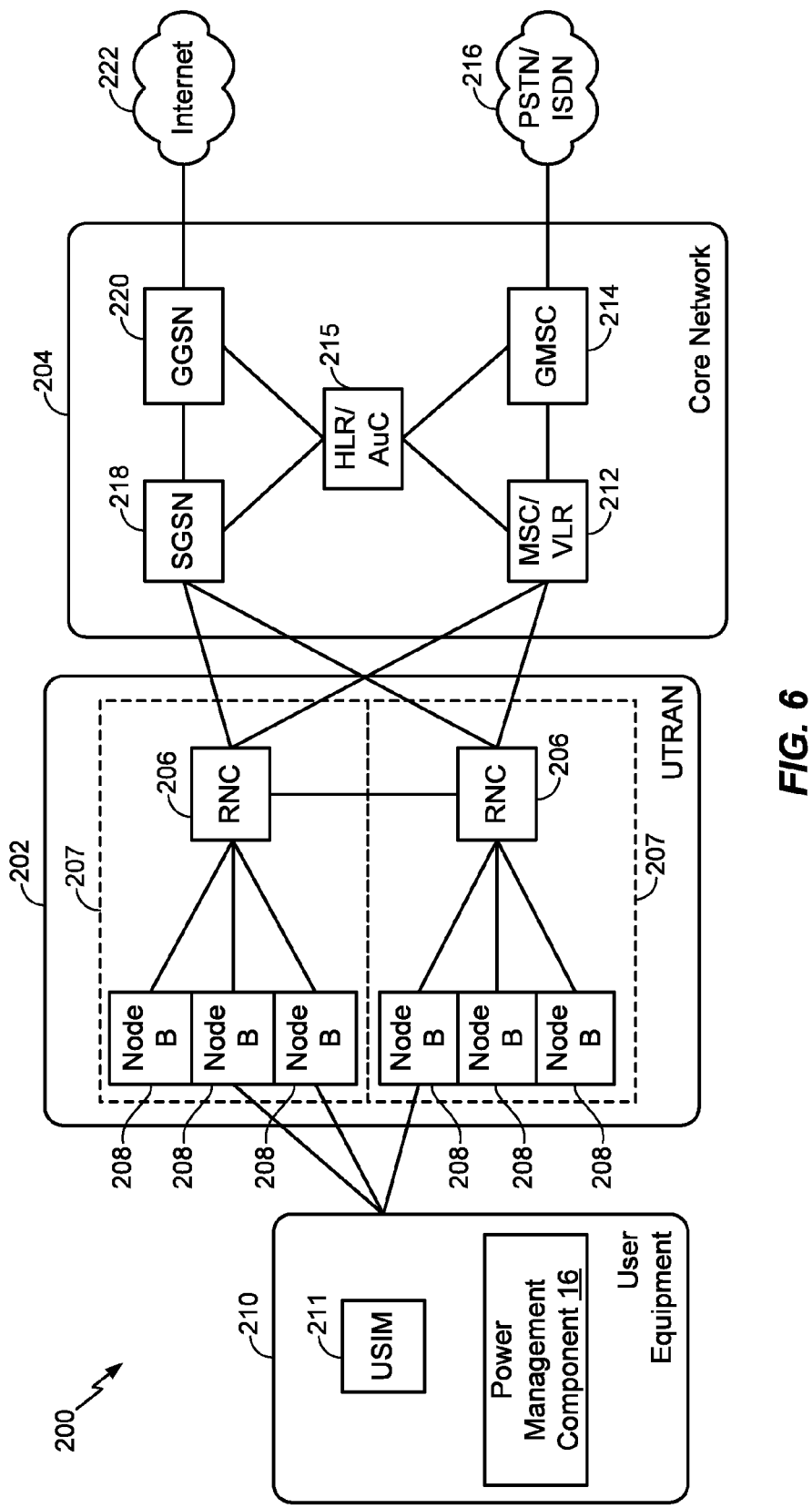
FIG. 6 is a block diagram conceptually illustrating an example of a telecommunications system including at least an aspect of the user equipment described herein.

By way of example and without limitation, the aspects of the present disclosure illustrated in FIG. 6 are presented with reference to a UMTS system 200 employing a W-CDMA air interface and including a UE 210 that may be the same as UE 12 (FIG. 1), e.g., operating power management component 16 (FIG. 1) as described herein. A UMTS network includes three interacting domains: a Core Network (CN) 204, a UMTS Terrestrial Radio Access Network (UTRAN) 202, and User Equipment (UE) 210. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global p tioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudo-random bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 7:
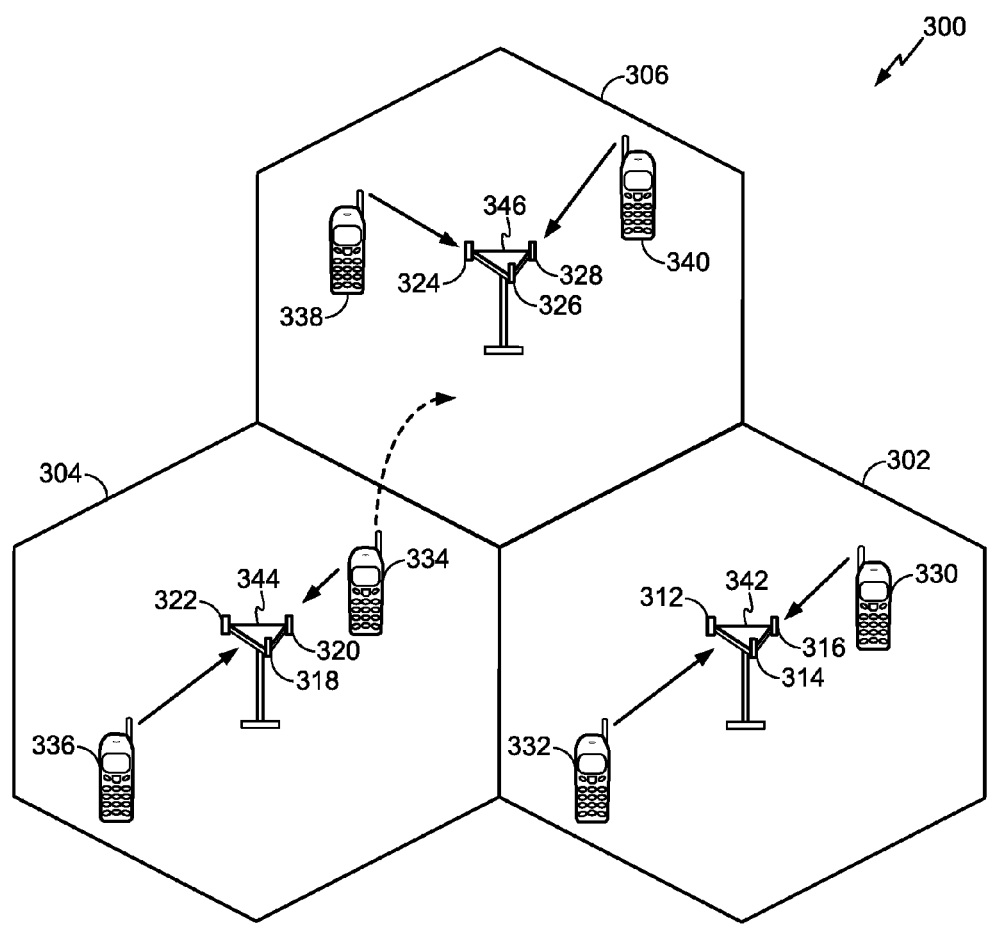
FIG. 7 is a conceptual diagram illustrating an example of an access network, e.g., according to FIG. 1.

Referring to FIG. 7, an access network 300 in a UTRAN architecture is illustrated. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 6) for all the UEs 330, 332, 334, 336, 338, 340 in the respective cells 302, 304, and 306. In an aspect, UEs 330, 332, 334, 336, 338, 338 and 340 may include the power management component 16 (FIG. 1).

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 6), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 8.

Figure 8:
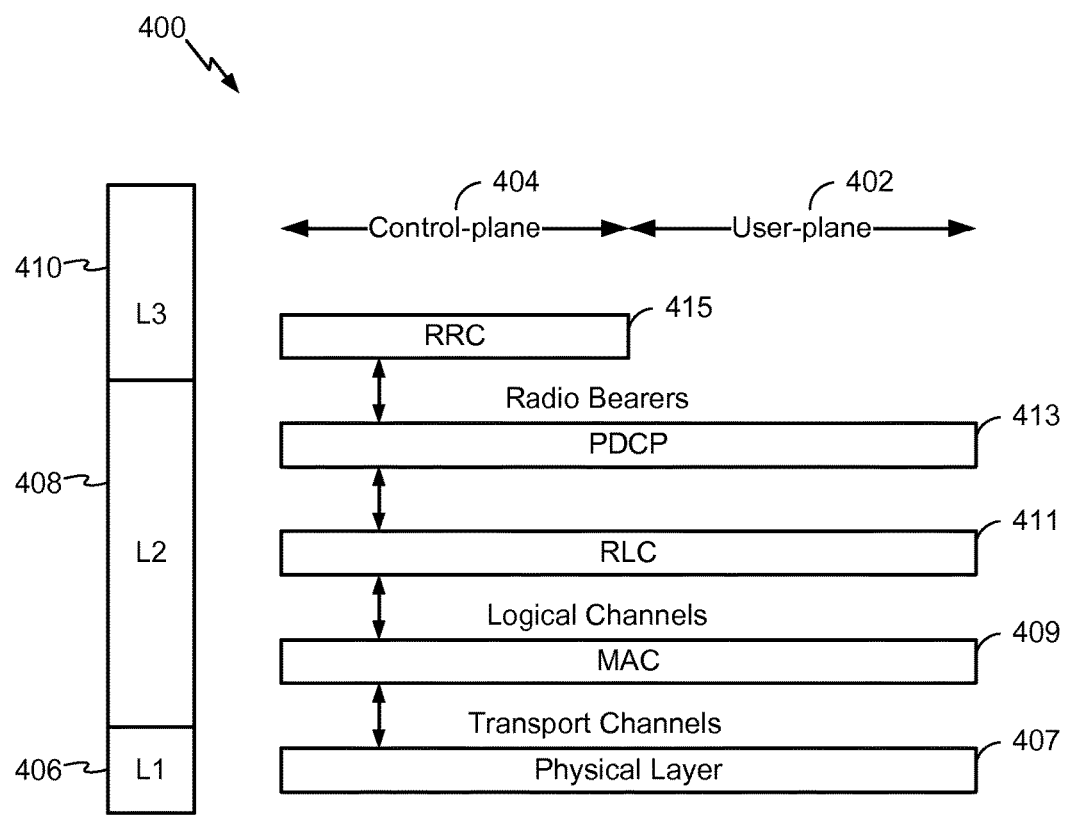
FIG. 8 is a conceptual diagram illustrating an example of a radio protocol architecture for the user and control plane that may be utilized by the user equipment described herein.

Referring to FIG. 8, an example radio protocol architecture 400 relates to the user plane 402 and the control plane 404 of a user equipment (UE) or node B/base station. For example, architecture 400 may be included in a UE such as UE 12 (FIG. 1) including power management component 16. The radio protocol architecture 400 for the UE and node B is shown with three layers: Layer 1 406, Layer 2 408, and Layer 3 410. Layer 1 406 is the lowest lower and implements various physical layer signal processing functions. As such, Layer 1 406 includes the physical layer 407. Layer 2 (L2 layer) 408 is above the physical layer 407 and is responsible for the link between the UE and node B over the physical layer 407. Layer 3 (L3 layer) 410 includes a radio resource control (RRC) sublayer 415. The RRC sublayer 415 handles the control plane signaling of Layer 3 between the UE and the UTRAN. Further, UE(s) in FIG. 8 may include the power management component 16 of FIG. 1.

In the user plane, the L2 layer 408 includes a media access control (MAC) sublayer 409, a radio link control (RLC) sublayer 411, and a packet data convergence protocol (PDCP) 413 sublayer, which are terminated at the node B on the network side. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 413 provides multiplexing between different radio bearers and logical channels. The PDCP sublayer 413 also provides header compression for upper layer data packets to reduce radio transmission overhead, security by ciphering the data packets, and handover support for UEs between node Bs. The RLC sublayer 411 provides segmentation and reassembly of upper layer data packets, retransmission of lost data packets, and reordering of data packets to compensate for out-of-order reception due to hybrid automatic repeat request (HARQ). The MAC sublayer 409 provides multiplexing between logical and transport channels. The MAC sublayer 409 is also responsible for allocating the various radio resources (e.g., resource blocks) in one cell among the UEs. The MAC sublayer 409 is also responsible for HARQ operations.

Figure 9:
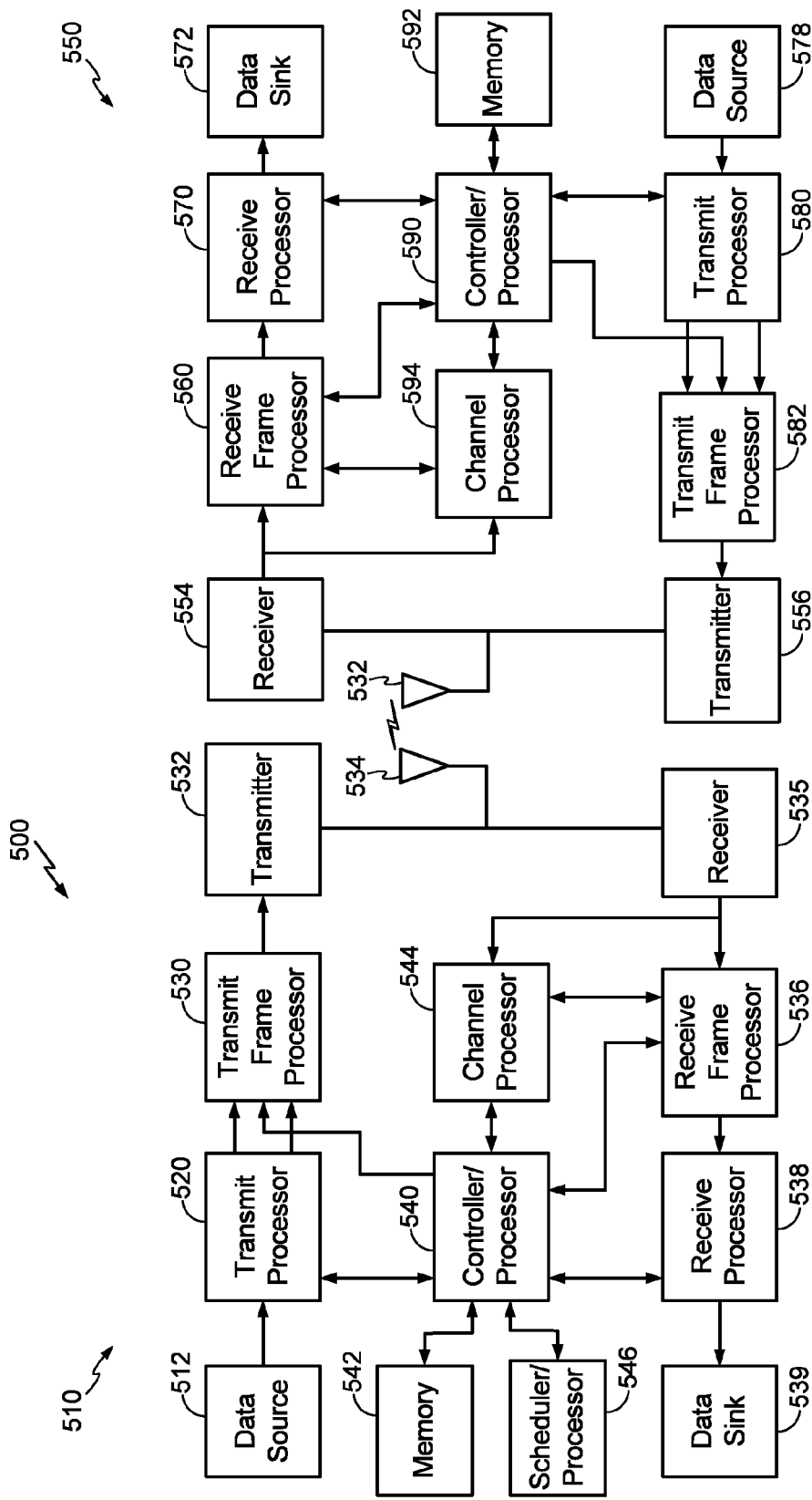
FIG. 9 is a block diagram conceptually illustrating an example of a Node B in communication with a UE in a telecommunications system, where the user equipment may be the same as or similar to the user equipment described herein.

FIG. 9 is a block diagram of a Node B 510 in communication with a UE 550, where the Node B 510 may be the Node B 208 in FIG. 6, and the UE 550 may be the UE 210 in FIG. 6, or the UE 12 in FIG. 1 including power management component 16. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme.

These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes.

The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members.

As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of power management, comprising:
    detecting, at a user equipment (UE), a state transition trigger, wherein the state transition trigger indicates a current data transmission termination or an anticipated data transmission termination;
    sending a state transition indication to a network entity in response to detecting the state transition trigger, wherein the state transition indication comprises at least one additional bit in a signal connection release indication (SCRI) to indicate UE autonomous state transition without network control; and
    adjusting a state of the UE based at least in part on sending the state transition indication to the network entity.

2. The method of claim 1, wherein the state transition indication further comprises:
    at least two bits to indicate a desired UE target radio resource control (RRC) state.

3. The method of claim 2, wherein the state transition indication is included in an RRC message, including at least one of a signal connection release indication (SCRI) and a target state indication, on a control plane in response to the state transition trigger indicating the current data transmission termination.

4. The method of claim 3, wherein the current data transmission termination comprises at least one of an expiration of an inactivity timer or a determination of a last packet transmitted to the network entity.

5. The method of claim 3, wherein the target state indication specifies a UE target state, and wherein the UE target state includes at least one of an Idle, a Forward Access Channel (CELL_FACH), Cell Paging Channel (CELL_PCH), or a Universal Terrestrial Radio Access Network (UTRAN) Registration Area (CELL_URA).

6. The method of claim 2, wherein the state transition indication is included in at least one of a media access control (MAC) message or a radio link control (RLC) message, including at least one of signaling connection release indication (SCRI) or a target state indication embedded in a last packet on a user plane in response to the state transition trigger indicating the anticipated data transmission termination.

7. The method of claim 6, wherein the anticipated data termination comprises at least one of an expiration of an inactivity timer or a determination of a last packet of data to be transmitted to the network entity.

8. The method of claim 6, wherein the target state indication specifies a UE target state, and wherein the UE target state includes at least one of an Idle, a Forward Access Channel (CELL_FACH), Cell Paging Channel (CELL_P-CH),or a Universal Terrestrial Radio Access Network (UTRAN) Registration Area (CELL_URA).

9. The method of claim 1, wherein adjusting the state of the UE comprises entering a low power state.

10. The method of claim 9, wherein entering the low power state comprises entering before or after receiving a data reception acknowledgement message (ACK) from the network entity.

11. The method of claim 9, wherein entering the low power state without receiving a network originated low power initiation message.

12. The method of claim 1, further comprising:
    releasing a network connection after sending the state transition indication to the network entity.

13. A non-transitory computer readable medium storing computer executable code for power management, comprising code to:
    detect, at a user equipment (UE), a state transition trigger, wherein the state transition trigger indicates a current data transmission termination or an anticipated data transmission termination;
    send a state transition indication to a network entity in response to detecting the state transition trigger, wherein the state transition indication comprises at least one additional bit in a signal connection release indication (SCRI) to indicate UE autonomous state transition without network control; and
    adjust a state of the UE based at least in part on sending the state transition indication to the network entity.

14. An apparatus for power management, comprising:
    means for detecting, at a user equipment (UE), a state transition trigger, wherein the state transition trigger indicates a current data transmission termination or an anticipated data transmission termination;
    means for sending a state transition indication to a network entity in response to detecting the state transition trigger, wherein the state transition indication comprises at least one additional bit in a signal connection release indication (SCRI) to indicate UE autonomous state transition without network control; and
    means for adjusting a state of the UE based at least in part on sending the state transition indication to the network entity.

15. An apparatus for power management, comprising:
    a memory; and
    at least one processor coupled to the memory and configured to:
        detect, at a user equipment (UE), a state transition trigger, wherein the state transition trigger indicates a current data transmission termination or an anticipated data transmission termination;
        send a state transition indication to a network entity in response to detecting the state transition trigger, wherein the state transition indication comprises at least one additional bit in a signal connection release indication (SCRI) to indicate UE autonomous state transition without network control; and
        adjust a state of the UE based at least in part on sending the state transition indication to the network entity.

16. The apparatus of claim 15, wherein the state transition indication further comprises:
    at least two bits to indicate a desired UE target radio resource control (RRC) state.

17. The apparatus of claim 15, wherein the state transition indication is included in an RRC message, including at least one of a signal connection release indication (SCRI) and a target state indication, on a control plane in response to the state transition trigger indicating the current data transmission termination.

18. The apparatus of claim 17, wherein the current data transmission termination comprises at least one of an expiration of an inactivity timer or a determination of a last packet transmitted to the network entity.

19. The apparatus of claim 17, wherein the target state indication specifies a UE target state, and wherein the UE target state includes at least one of an Idle, a Forward Access Channel (CELL_FACH), Cell Paging Channel (CELL_PCH), or a Universal Terrestrial Radio Access Network (UTRAN) Registration Area (CELL_URA).

20. The apparatus of claim 15, wherein adjusting the state of the UE comprises entering a low power state.

\* \* \* \* \*